May 4, 1948. G. LEVESQUE DU ROSTU 2,441,024
TRAILER COUPLING
Filed March 28, 1946 2 Sheets-Sheet 1
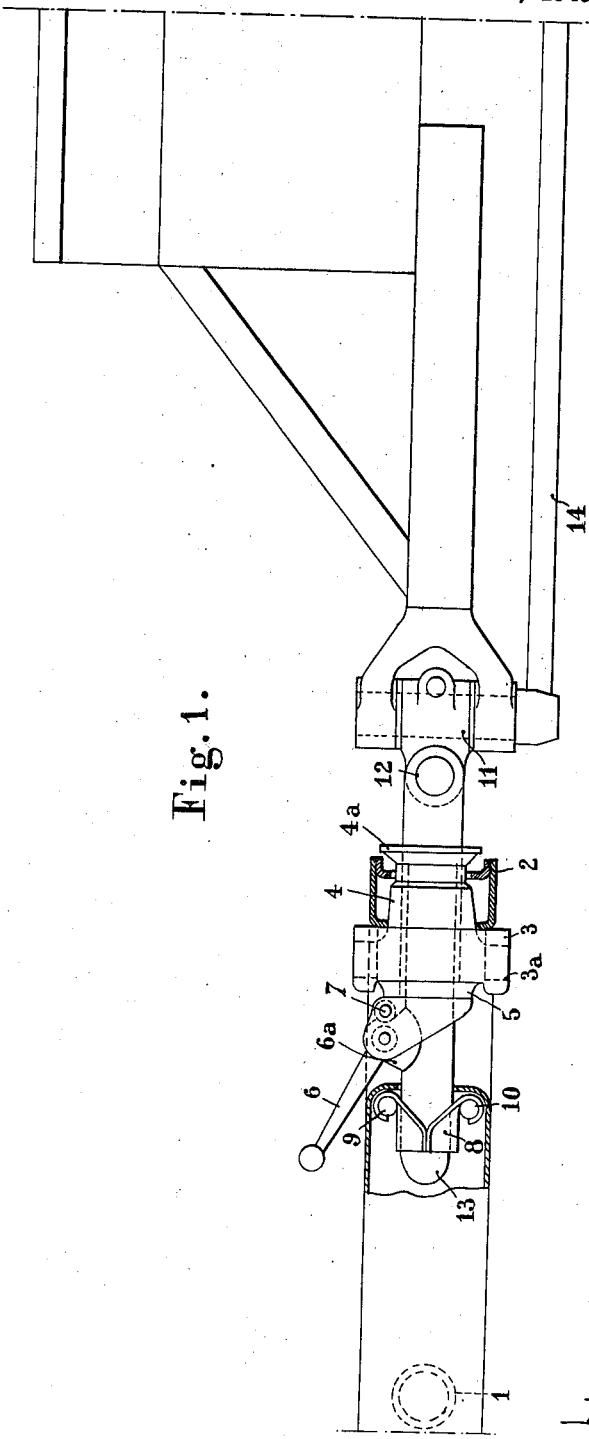
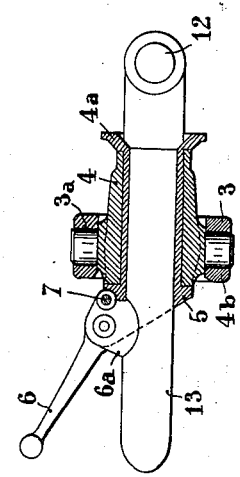
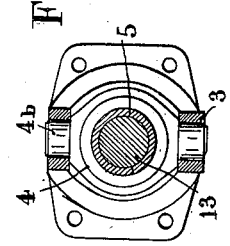
Inventor
G. Levesque du Rostu

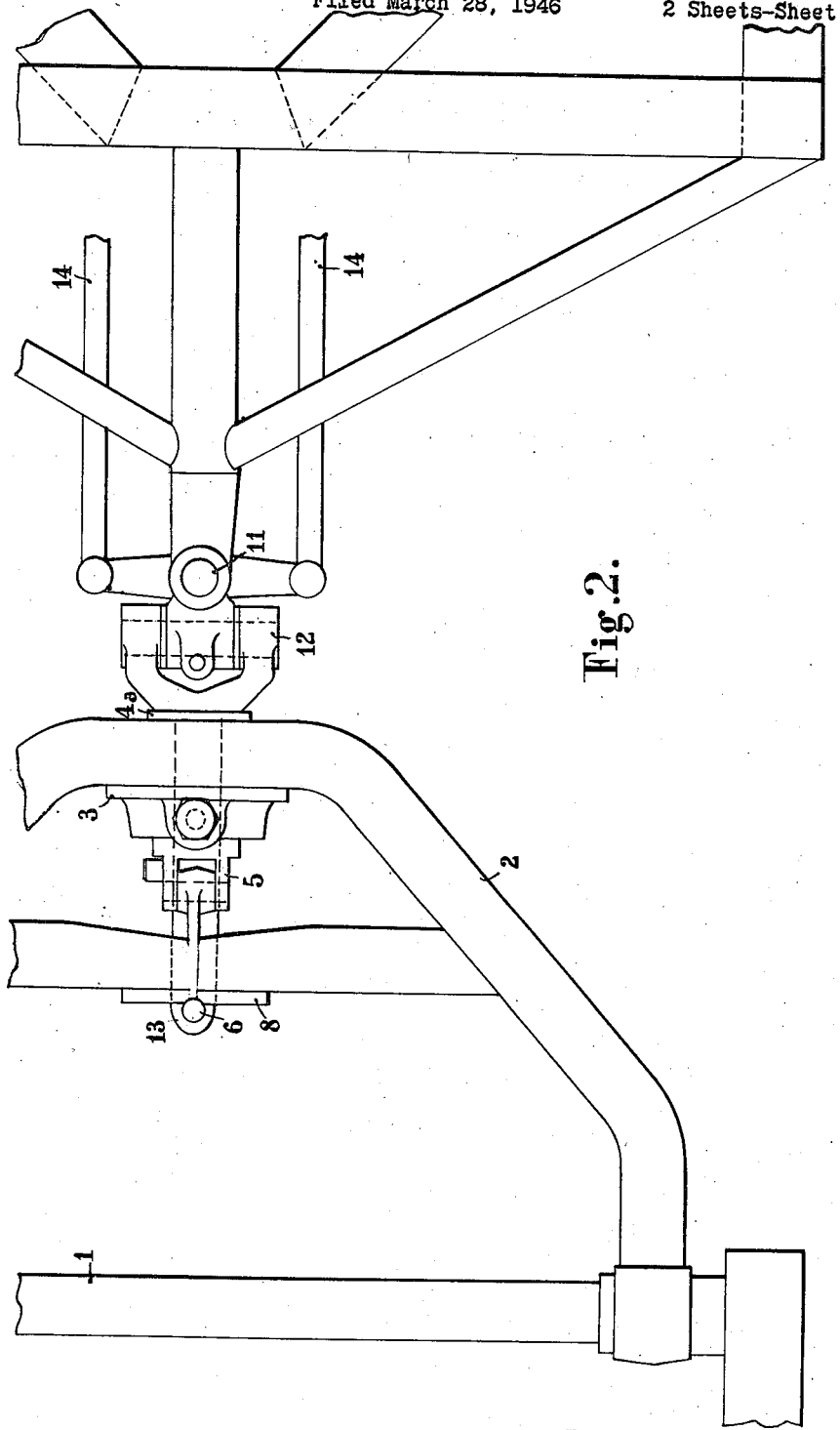

Patented May 4, 1948

2,441,024

UNITED STATES PATENT OFFICE 2,441,024

TRAILER COUPLING

Georges Levesque du Rostu, Paris, France, assignor to Société Anonyme André Citroen, Paris, France Application March 28, 1946, Serial No. 657,741
In France April 12, 1945

2 Claims. (Cl. 280—33.15)

The towing and steering of a trailer by means of a coupling gear with two fulcrums in one horizontal plane is by no ways a safe one as far as skidding and transversal forces are concerned. Moreover, such coupling means will not allow negotiating a curve backwards and involves a larger distance between the towing and the towed vehicles, which results in an increase in the length of the whole train.

The one-pivot coupling gear providing the subject-matter of this invention does away with every nosing movement of the trailer which will exactly remain on the track of the tractor at all speeds and makes back running possible in curves, which is a highly desirable advantage in operation.

One embodiment of the coupling gear according to this invention is shown by way of example in the drawing appended hereto.

Figure 1 a top plan view and

Figure 2 an elevational view with parts shown in section.

Figures 3 and 4 illustrate details of the coupling members in longitudinal and cross-sectional views respectively.

This coupling gear is comprised of two main parts:

(1) A movable part hinged to the tractor about a horizontal pintle 1 and adapted to be swung in below the tractor in its inoperative position; said part consists of:

A movable U-shaped member 2 having a ring-shaped member 3 secured at the centre thereof in which two vertical bores 3a are machined;

A sleeve 4 carrying a rear funnel 4a to facilitate the coupling operation and a pair of vertical trunnions 4b by which it is enabled to swivel in the ring-shaped member 3, whereby it becomes possible to couple two vehicles with each other that are not quite in alignment;

A support 5 in which a lever 6 is pivoted which is formed with a cam 6a adapted to lock the bar 13 and provided with a safety bolt 7, the whole of which, inclusive of the bar, being freely rotatable in the coupled position of the trailer, whereby the latter is able to tilt with respect to the tractor;

A pair of spring-loaded sleeve halves 8 fulcrumed about pins 9 and 10 to hold the bar 13 in fixed position in alignment with the tractor after moving off, for the purpose of acting upon the trailer wheels and consequently steering the said trailer.

(2) A fixed part fitted to the trailer and comprising:

A vertical bolt 11 operatively connected with the trailer wheel steering bars 14;

A horizontal pivot pin 12 allowing, in combination with the pintle 1 hinging the U-shaped member to the tractor, to deal with road unevennesses;

The bar 13 hinged on pin 12, which provides for connection between the tractor and the trailer.

Before coupling, the spindle or bar 13 and the socket 4 are both capable of swivelling round their vertical pivotal axes, to wit the axis 11 for the bar 13 and the trunnion 4b for the socket or sleeve 4. Through the operation of said two vertical axes, the bar and socket come into alignment when fitted into one another, even if the tractor and trailer are not in alignment. Once the bar is fitted inside the socket 4, it is locked therein through the agency of the cam 6a.

The vehicle may then be started moving and the trailer comes into alignment with the tractor. The straps or half sleeves 8 engage then the bar 13 to hold same firmly along the axis of the tractor whereby the sleeve 4 and the bar 13 fitted therein may no longer rotate round the trunnion 4b. The coupling system, that was provided with two vertical operative axes for making the coupling easier, is provided only with one of such after coupling and starting which has for its result an easier steering.

It will be appreciated that the angular displacements of the tractor and the trailer in the horizontal plane will take place about one single vertical bolt 11 and that the arrangement of the coupling gear permits of minimizing the distance between either vehicle. Of course, the details specifically shown can be modified, and the various parts of this coupling gear can be replaced by any substantially equivalent one without thereby departing from the scope of this invention.

What I claim as my invention and desire to secure by Letters Patent is:

1. A trailer coupling gear comprising a strap shaped member pivotally secured to the tractor round a horizontal axis, a socket pivotally secured to said strap shaped member round a vertical diametrical axis, a tubular support fitted inside said socket and adapted to rotate therein round the common longitudinal axis of the socket and support, a coupling bar adapted to slidingly engage said support, means for locking the bar in a predetermined position with reference to the tubular support, a double pivoting joint adapted to connect the coupling bar with the trailer and means for locking the outer end of the coupling bar to the strap shaped member to prevent operation after coupling of the vertical pivoting axis through which the socket is adapted to pivot with reference to said strap shaped member.

2. A trailer coupling gear comprising a strap shaped member pivotally secured to the tractor round a horizontal axis, a socket pivotally secured to said strap shaped member round a vertical diametrical axis, a tubular support fitted inside said socket and adapted to rotate therein round the common longitudinal axis of the socket and support, a coupling bar adapted to slidingly engage said support, means for locking the bar in a predetermined position with reference to the tubular support, a connecting member pivotally secured through a horizontal axis with the coupling bar and through a vertical axis with the trailer, a transversal lever rigid with said connecting member, steering bars pivotally connected to the ends of said lever for controlling the angular setting of the trailer wheel, and means for locking the outer end of the coupling bar to the strap shaped member to prevent operation after coupling of the vertical pivoting axis through which the socket is adapted to pivot with reference to said strap shaped member.

GEORGES LEVESQUE DU ROSTU.

REFERENCES CITED

The following references are of record in the file of this patent:

UNITED STATES PATENTS

| Number | Name | Date |
|---|---|---|
| 2,012,639 | Rub | Aug. 27, 1935 |
| 2,047,206 | Knapp | July 14, 1936 |
| 2,133,065 | Weber | Oct. 11, 1938 |